(12) United States Patent
Tanabe et al.

(10) Patent No.: US 10,879,620 B2
(45) Date of Patent: Dec. 29, 2020

(54) ANTENNA DIRECTIVITY ADJUSTMENT APPARATUS AND ANTENNA DIRECTIVITY ADJUSTMENT METHOD

(71) Applicant: NEC Corporation, Tokyo (JP)

(72) Inventors: Kosuke Tanabe, Tokyo (JP); Tsunehisa Marumoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/496,209

(22) PCT Filed: Feb. 8, 2018

(86) PCT No.: PCT/JP2018/004440
§ 371 (c)(1),
(2) Date: Sep. 20, 2019

(87) PCT Pub. No.: WO2018/173535
PCT Pub. Date: Sep. 27, 2018

(65) Prior Publication Data
US 2020/0052410 A1      Feb. 13, 2020

(30) Foreign Application Priority Data
Mar. 22, 2017    (JP) ................. 2017-056089

(51) Int. Cl.
*H04B 7/145*          (2006.01)
*H01Q 19/02*          (2006.01)
(Continued)

(52) U.S. Cl.
CPC ........... *H01Q 19/021* (2013.01); *H01Q 13/02* (2013.01); *H01Q 19/062* (2013.01); *H01Q 19/13* (2013.01); *H04B 7/145* (2013.01)

(58) Field of Classification Search
CPC .... H01Q 19/021; H01Q 13/02; H01Q 19/062; H01Q 19/13; H04B 7/145
(Continued)

(56) References Cited

U.S. PATENT DOCUMENTS 4,837,576 A * 6/1989 Schwarz ................. G01S 13/68
342/75
5,418,539 A * 5/1995 Sezai .................... G01S 7/2813
342/157
(Continued)

FOREIGN PATENT DOCUMENTS

JP      56-069109      6/1981
JP      04-192602 A    7/1992
(Continued)

OTHER PUBLICATIONS

International Search Report for PCT/JP2018/004440 dated May 1, 2018 [PCT/ISA/210].

*Primary Examiner* — Hai V Nguyen
(74) *Attorney, Agent, or Firm* — Sughrue Mion, PLLC

(57) ABSTRACT

The present disclosure aims to provide an antenna directivity adjustment apparatus and an antenna directivity adjustment method capable of preventing an antenna gain from being reduced and easily adjusting a direction of an antenna. An antenna directivity adjustment apparatus (1) includes: a second antenna (2) that is opposed to a radiation surface (100a) of a first antenna (100) and receives radio waves output from the first antenna (100); and an output unit (3) that is provided in the second antenna (2), converts a first beam width of the received radio waves into a second beam width wider than the first beam width, and outputs the radio waves having the second beam width.

9 Claims, 9 Drawing Sheets

(51) Int. Cl.
*H01Q 19/06* (2006.01)
*H01Q 13/02* (2006.01)
*H01Q 19/13* (2006.01)

(58) Field of Classification Search
USPC .......................................................... 455/25
See application file for complete search history.

(56) References Cited

U.S. PATENT DOCUMENTS

| | | | | |
|---|---|---|---|---|
| 5,422,637 A * | 6/1995 | Sezai | ................ | H01Q 21/296 342/13 |
| 5,512,899 A * | 4/1996 | Osawa | ................ | G01S 13/9027 342/25 A |
| 5,929,808 A * | 7/1999 | Hassan | ................ | H01Q 1/1257 342/359 |
| 6,043,788 A * | 3/2000 | Seavey | ................ | H01Q 3/20 343/765 |
| 6,836,675 B2 * | 12/2004 | Zhang | ................ | H04W 24/02 342/357.395 |
| 8,320,283 B2 * | 11/2012 | Kim | ................ | H04L 1/0029 370/260 |
| 8,451,951 B2 * | 5/2013 | Caire | ................ | H04L 1/0025 375/340 |
| 8,502,733 B1 * | 8/2013 | Negus | ................ | H04B 7/0617 342/359 |
| 8,553,796 B2 * | 10/2013 | Oyman | ................ | H04B 7/0456 375/267 |
| 8,849,288 B2 * | 9/2014 | Vilhar | ................ | H04B 17/12 455/446 |
| 8,855,730 B2 * | 10/2014 | Sanford | ................ | H01Q 1/428 455/575.7 |
| 9,467,219 B2 * | 10/2016 | Vilhar | ................ | G01R 29/10 |
| 9,485,004 B2 * | 11/2016 | Vilhar | ................ | H01Q 17/001 |
| 9,634,373 B2 * | 4/2017 | Lee | ................ | H01Q 1/1228 |
| 10,051,486 B2 * | 8/2018 | Vilhar | ................ | G01R 29/10 |
| 10,096,886 B2 * | 10/2018 | Xu | ................ | H01Q 1/1257 |
| 10,217,047 B2 * | 2/2019 | O'Shea | ................ | G06N 3/0445 |
| 10,305,553 B2 * | 5/2019 | O'Shea | ................ | G06N 3/0445 |
| 10,355,352 B2 * | 7/2019 | Wattwood | ................ | H01Q 3/08 |
| 10,541,462 B2 * | 1/2020 | Trushanin | ................ | H01Q 1/1257 |
| 10,552,738 B2 * | 2/2020 | Holt | ................ | G06N 3/084 |
| 10,605,888 B1 * | 3/2020 | Azem | ................ | G01S 3/38 |
| 10,608,760 B2 * | 3/2020 | Cordone | ................ | H04B 7/1853 |
| 2002/0090941 A1 * | 7/2002 | Zhang | ................ | H01Q 1/1257 455/423 |
| 2003/0227416 A1 * | 12/2003 | Meitzler | ................ | H01Q 19/06 343/755 |
| 2006/0267764 A1 * | 11/2006 | Morinaga | ................ | G01S 13/04 340/545.3 |
| 2013/0040594 A1 * | 2/2013 | Vilhar | ................ | H04W 16/28 455/226.4 |
| 2014/0043181 A1 * | 2/2014 | Vilhar | ................ | H04B 7/0882 342/1 |
| 2014/0357210 A1 * | 12/2014 | Vilhar | ................ | H04B 17/309 455/226.4 |
| 2016/0104941 A1 * | 4/2016 | Lee | ................ | H01Q 1/242 343/702 |
| 2017/0026854 A1 * | 1/2017 | Vilhar | ................ | H04W 16/28 |
| 2017/0149480 A1 * | 5/2017 | Kakishima | ................ | H04B 7/024 |
| 2017/0229773 A1 * | 8/2017 | Lee | ................ | H01Q 1/242 |
| 2017/0293740 A1 * | 10/2017 | Xing | ................ | G06Q 30/0226 |

FOREIGN PATENT DOCUMENTS

| | | |
|---|---|---|
| JP | 05-003447 A | 1/1993 |
| JP | 07-022836 A | 1/1995 |
| JP | 2002-033611 A | 1/2002 |
| JP | 2002-299940 A | 10/2002 |
| JP | 2005-236426 A | 9/2005 |
| JP | 2006-105866 A | 4/2006 |

\* cited by examiner

ANTENNA DIRECTIVITY ADJUSTMENT APPARATUS AND ANTENNA DIRECTIVITY ADJUSTMENT METHOD

CROSS REFERENCE TO RELATED APPLICATIONS

This application is a National Stage of International Application No. PCT/JP2018/004440 filed Feb. 8, 2018, claiming priority based on Japanese Patent Application No. 2017-056089 filed Mar. 22, 2017, the disclosure of which is incorporated herein in its entirety by reference.

TECHNICAL FIELD

The present disclosure relates to an antenna directivity adjustment apparatus and an antenna directivity adjustment method.

BACKGROUND ART

When a radio system of a mobile backhaul is installed, in order to increase communication quality between radio communication apparatuses opposed to each other, it is required to cause beams of radio waves radiated from antennas of the radio communication apparatuses opposed to each other to be accurately opposed to each other. Therefore, it is needed to adjust directions of the antennas in such a way that the beams of the radio waves radiated from the antennas of the radio communication apparatuses opposed to each other are accurately opposed to each other.

As a method of performing direction adjustment of the antennas, an operator performs, for example, direction adjustment by checking the reception level of the radio waves radiated from the antenna of the other opposing radio communication apparatus. That is, the operator receives radio waves radiated from the antenna of the opposing radio communication apparatus, and adjusts the horizontal direction (azimuth direction) and the elevation angle direction (elevation direction) of the antenna using the reception level that has been converted into a voltage in such a way that the voltage becomes a maximum. However, the direction adjustment of the antenna of the opposing radio communication apparatus is not easy since the operator needs to manually perform this adjustment. In order to solve this problem, related art for adjusting directions of antennas as disclosed in, for example, Patent Literature 1 and 2 have been proposed.

Patent Literature 1 discloses that the reception level of radio waves transmitted from a base station is calculated by a simulation in advance in a subscriber station that is the farthest from the base station, the reception level of the radio waves transmitted from the base station received by an antenna of the above subscriber station is monitored, and direction adjustment of the antenna is performed in such a way that the reception level that has been monitored matches the reception level calculated by the simulation.

Patent Literature 2 discloses a technique for providing an adjustment cover that can be coated on a reflector of an antenna, increasing the beam width of the radio waves output from the antenna (angle width at which power is halved), and adjusting the direction of the opposing antenna.

CITATION LIST

Patent Literature

[Patent Literature 1] Japanese Unexamined Patent Application Publication No. 2002-33611

[Patent Literature 2] Japanese Unexamined Patent Application Publication No. 2005-236426

SUMMARY OF INVENTION

Technical Problem

In recent years, in accordance with a large capacity of communication, the frequency used in communication has become higher and the size of the opening of a long-distance propagation antenna has become larger. The frequencies used in the communication are, for example, 60 GHz band, 70/80 GHz band, and 100 GHz or larger. In accordance with an increase in the frequency of the usage frequency, the beam width of the radio waves radiated from the antenna (angle width at which power is halved) has become smaller. Therefore, when, for example, the usage frequency is 70/80 GHz band and the opening diameter of the antenna is 60 cm, the beam width of the radio waves radiated from the antenna (angle width at which power is halved) becomes quite narrow, that is, about 0.5 degrees.

Therefore, in the technique disclosed in Patent Literature 1, when the beam width of the radio waves radiated from the antenna is narrow as described above, it is difficult for an operator who adjusts the directions of the antennas to find the main lobe of the radio waves radiated from the antenna in the other antenna that is opposed to this antenna, and the directions of the antennas cannot be easily adjusted. Even if the operator could successfully find this main lobe, the reception level of the radio waves output from the antenna is greatly changed even when the direction of an antenna is changed slightly since the beam width is quite narrow. Accordingly, in order to accurately align the directions of the antennas in such a way that the reception level of the radio waves output from the antenna matches the reception level calculated by the simulation, extremely precise adjustment is required, which is not easy to be accomplished.

Further, in the technique disclosed in Patent Literature 2, the adjustment cover is used in order to increase the beam width of the radio waves radiated from the antenna. However, radio waves are not radiated from the adjustment cover, and the energy of the radio waves in this part is lost. Therefore, in the technique disclosed in Patent Literature 2, there is a problem that the energy loss of the radio waves becomes large and reduction in the antenna gain increases.

The present disclosure has been made in order to solve the aforementioned problem, and aims to provide an antenna directivity adjustment apparatus and an antenna directivity adjustment method capable of preventing the antenna gain from being reduced and easily adjusting the direction of the antenna.

Solution to Problem

An antenna directivity adjustment apparatus according to a first aspect of the present disclosure includes: a second antenna that is opposed to a radiation surface of a first antenna and receives radio waves output from the first antenna; and an output unit that is provided in the second antenna, converts a first beam width of the received radio waves into a second beam width wider than the first beam width, and outputs the radio waves having the second beam width.

An antenna directivity adjustment method according to a second aspect of the present disclosure is an antenna directivity adjustment method executed by an antenna directivity adjustment apparatus including a second antenna that is opposed to a radiation surface of a first antenna, and includes: receiving radio waves output from the first antenna by the second antenna; converting a first beam width of the radio waves received by the second antenna into a second beam width wider than the first beam width; and outputting radio waves having the beam width after the conversion.

Advantageous Effects of Invention

According to the present disclosure, it is possible to prevent the antenna gain from being reduced and to easily adjust the direction of the antenna.

DESCRIPTION OF EMBODIMENTS

Hereinafter, with reference to the drawings, example embodiments will be explained. In the example embodiments, the same elements are denoted by the same reference symbols, and repetitive descriptions are avoided.

Outline of Example Embodiments

Figure 1:
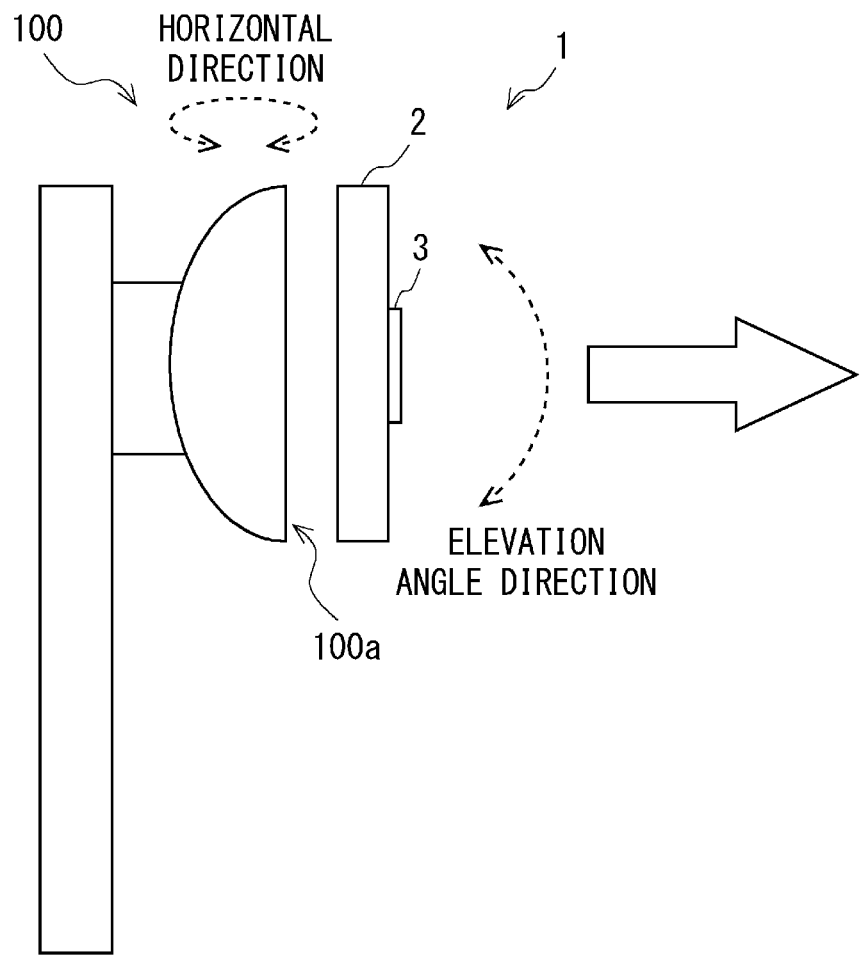
FIG. 1 is a schematic view showing an overview of an antenna directivity adjustment apparatus 1 according to an outline of example embodiments.

Prior to giving the description of example embodiments, an outline of example embodiments will be explained. FIG. 1 is a schematic view showing an overview of an antenna directivity adjustment apparatus 1 according to an outline of the example embodiments.

As shown in FIG. 1, the antenna directivity adjustment apparatus 1 is arranged in the vicinity of an antenna 100, which is a first antenna which requires direction adjustment, in such a way that the antenna directivity adjustment apparatus 1 is opposed to the antenna 100. The antenna 100 is, for example, a parabolic antenna, a planar antenna or the like. The antenna 100 outputs radio waves from a radiation surface 100*a*. The antenna 100 is configured in such a way that it can be rotated in the horizontal direction (azimuth direction) and the elevation angle direction (elevation direction) based on the ground surface. An operator who performs direction adjustment of the antenna 100 rotationally moves the antenna 100 in the horizontal direction and the elevation angle direction relative to the ground surface, thereby adjusting the antenna 100 in such a way that the main lobe of radio waves radiated from the antenna 100 matches the main lobe of another antenna that is opposed to the antenna 100.

The antenna directivity adjustment apparatus 1 includes a second antenna 2 and an output unit 3. The second antenna 2 may be, for example, a parabolic antenna, a planar antenna or the like. The second antenna 2 is arranged in the vicinity of the radiation surface 100*a* of the antenna 100 so as to be opposed thereto, and receives the radio waves output from the antenna 100.

The output unit 3 is provided in the second antenna 2, increases a first beam width (angle width at which power is halved) of the radio waves received by the second antenna 2 using all the radio waves received by the second antenna 2, and converts the first beam width into a second beam width wider than the first beam width. The output unit 3 outputs radio waves having the second beam (angle width at which power is halved) width after the conversion from the second antenna. In the following description, the beam width (angle width at which power is halved) of the radio waves is simply referred to as a beam width.

In the antenna directivity adjustment apparatus 1 according to the example embodiments, the output unit 3 increases the first beam width of the radio waves received by the second antenna 2 using all the radio waves received by the second antenna 2, and converts the first beam width into the second beam width wider than the first beam width. Accordingly, according to the antenna directivity adjustment apparatus 1 of the example embodiments, compared to the related technique disclosed in Patent Literature 2, it becomes possible to prevent the energy loss from occurring and to prevent the antenna gain from being reduced.

Further, the antenna directivity adjustment apparatus 1 according to the example embodiments converts the first beam width of the radio waves output from the antenna 100 into radio waves having the second beam width which is larger than the first beam width and outputs the radio waves having the second beam width. Therefore, even when the beam width of the radio waves output from the antenna 100 is narrow, the operator who adjusts the direction of the antenna 100 is able to easily detect the main lobe of the radio waves output from the antenna 100 in the other antenna that is opposed to the antenna 100.

Further, the operator who adjusts the direction of the antenna 100 is able to adjust the direction of the antenna 100 using radio waves (main lobe) having the second beam width larger than the first beam width of the radio waves output from the antenna 100. Accordingly, the operator is able to easily adjust the direction of the antenna 100.

First Example Embodiment

Hereinafter, with reference to the drawings, example embodiments of the present disclosure will be explained.

Figure 2:
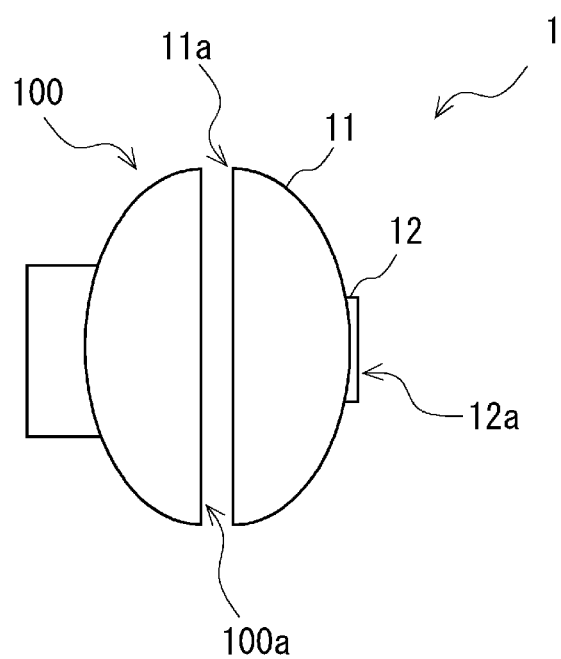
FIG. 2 is a schematic side view of an antenna directivity adjustment apparatus according to a first example embodiment.

FIG. 2 is a schematic side view of an antenna directivity adjustment apparatus 1 according to the first example embodiment. The antenna directivity adjustment apparatus 1 is arranged in the vicinity of the antenna 100 so as to be opposed thereto. The antenna directivity adjustment apparatus 1 may be connected to the antenna 100 by a connection part (not shown). The antenna 100 is, for example, a parabolic antenna, a planar antenna or the like. The antenna 100 is configured in such a way that it can be rotated in the horizontal direction (azimuth direction) and the elevation angle direction (elevation direction) relative to the ground surface. In the following description, for the sake of convenience, the antenna 100 is described to be a parabolic antenna. However, this is merely an example. The antenna 100 may be another antenna such as a planar antenna.

The antenna directivity adjustment apparatus 1 includes a parabolic antenna 11 and a waveguide 12. The parabolic antenna 11 corresponds to the second antenna 2 described in the outline of the example embodiments. The parabolic antenna 11 is an antenna that focuses the received radio waves on the focal point by a reflector. The parabolic antenna 11 includes a receiving opening 11*a*.

The receiving opening 11*a* is arranged in the vicinity of the radiation surface 100*a* of the antenna 100 so as to be opposed thereto, and receives radio waves output from the radiation surface 100*a*. It can be said that the receiving opening 11*a* is a reception surface since it is a surface that receives radio waves. The receiving opening 11*a* has, for example, an area and a shape substantially the same as those of the radiation surface 100*a* of the antenna 100. However, this is merely an example. The area of the receiving opening 11*a* may be larger than the area of the radiation surface 100*a* of the antenna 100 or the area of the receiving opening 11*a* may be smaller than the area of the radiation surface 100*a* of the antenna 100.

The waveguide 12 is, for example, a rectangular waveguide or a circular waveguide. The waveguide 12 has one end connected to the parabolic antenna 11 and the other end that has an opening. This opening is referred to as a Waveguide (WG) opening 12*a*. The waveguide 12 introduces radio waves output from the parabolic antenna 11, reduces the energy loss of the introduced radio waves and transmits the radio waves after the energy loss is reduced, and outputs the transmitted radio waves from the WG opening 12*a*. Therefore, it can be said that the WG opening 12*a* is an output opening. The WG opening 12*a* corresponds to the output unit 3 described in the outline of the example embodiments. The WG opening 12*a* converges the radio waves received by the receiving opening 11*a* of the parabolic antenna 11, converts the radiation pattern of the radio waves, and outputs the resulting radio waves. The WG opening 12*a* is provided in such a way that it causes the radio waves output from the radiation surface 100*a* of the antenna 100 to penetrate therethrough. Therefore, the main lobe of the radio waves output from the WG opening 12*a* is formed in the same direction as the main lobe of the radio waves output from the antenna 100.

Now, the relation between the beam width of the radio waves output from the WG opening 12*a* and the opening area of the WG opening 12*a* will be explained. First, the beam width of the radio waves output from the WG opening 12*a* is changed in accordance with the antenna gain. Specifically, the beam width of the radio waves output from the WG opening 12*a* becomes narrow as the antenna gain increases. In other words, the beam of the main lobe of the radio waves output from the WG opening 12*a* becomes sharper as the antenna gain is made larger.

Further, the antenna gain of the radio waves output from the WG opening 12*a* depends on the opening area of the WG opening 12*a*. Specifically, the antenna gain becomes larger as the area of the WG opening 12*a* is larger. Therefore, the relation between the beam width of the radio waves output from the WG opening 12*a* and the opening area of the WG opening 12*a* corresponds to a relation that the beam width of the radio waves output from the WG opening 12*a* becomes wider as the opening area of the WG opening 12*a* is made smaller. The above relation is not limited to being applied to the parabolic antenna 11 and may be applied also to other antennas.

The antenna directivity adjustment apparatus 1 according to this example embodiment converts the beam width of the radio waves output from the antenna 100 so as to widen the beam width, and outputs the resulting radio waves from the WG opening 12*a*. Therefore, the opening area of the WG opening 12*a* is configured to be smaller than the area of the receiving opening 11*a*. In this example embodiment, as one example, the receiving opening 11*a* is described to substantially the same as the opening area of the radiation surface 100*a* of the antenna 100. Therefore, it can be said that the opening area of the WG opening 12*a* is smaller than the opening area of the radiation surface 100*a* of the antenna 100. According to this configuration, the beam width of the radio waves output from the WG opening 12*a* can be converted in such a way that it becomes wider than the beam width of the radio waves received by the receiving opening 11*a*.

Figure 3:
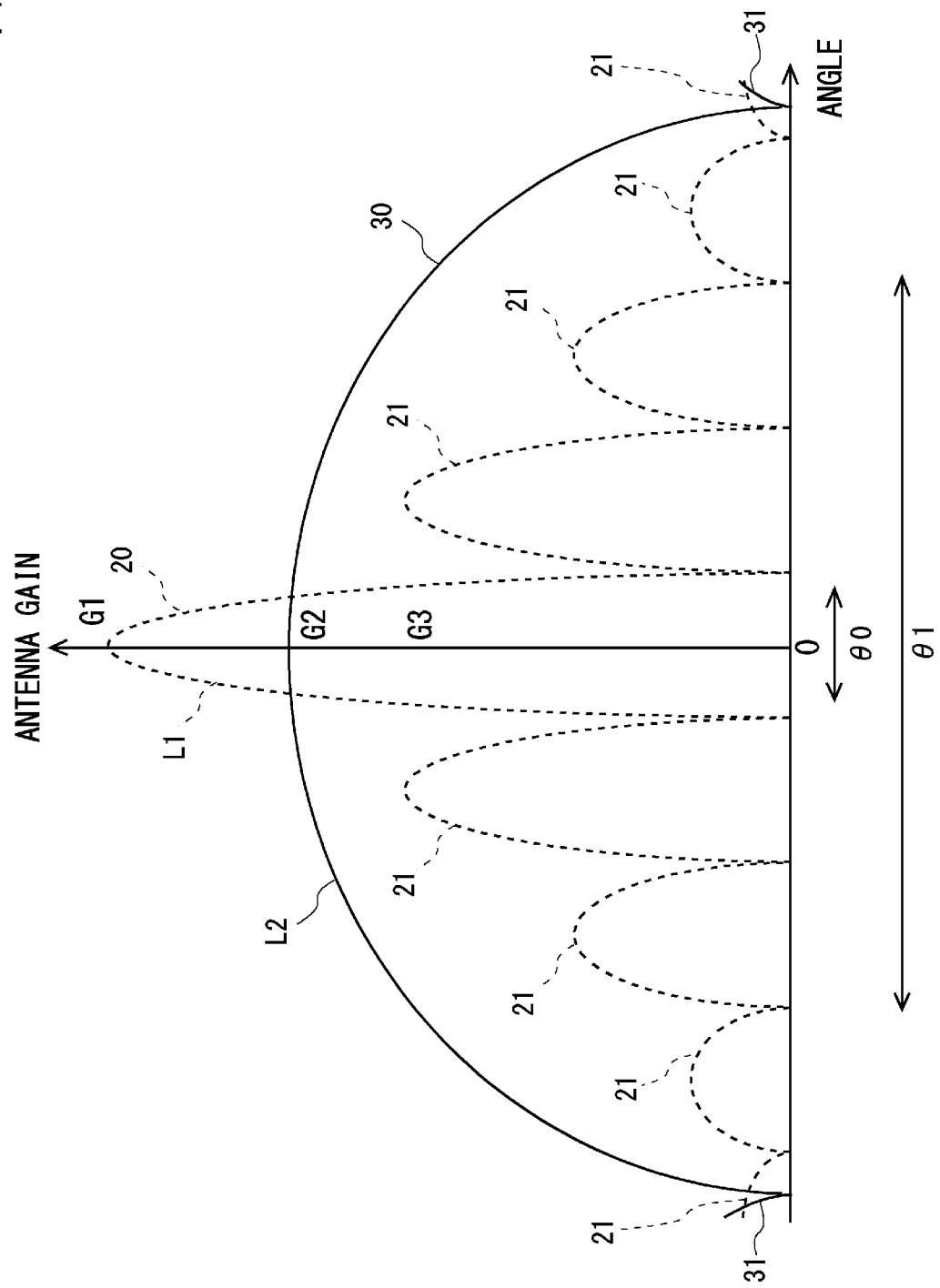
FIG. 3 is a schematic view showing radiation patterns of radio waves output from the antenna directivity adjustment apparatus according to the first example embodiment.

Referring next to FIG. 3, radiation patterns of radio waves radiated by the antenna directivity adjustment apparatus 1 according to this example embodiment will be explained. FIG. 3 is a schematic view showing an overview of the radiation patterns of the radio waves radiated by the antenna directivity adjustment apparatus 1 according to the first example embodiment. The radiation patterns of the radio waves radiated by the antenna directivity adjustment apparatus 1 are rotationally symmetrical relative to an axis (not shown) which is vertical to the radiation surface 100*a* of the antenna 100 and in the maximum radiation direction of the radio waves output from the antenna 100. That is, the radiation patterns of the radio waves output from the antenna directivity adjustment apparatus 1 in the horizontal direction and those in the elevation angle direction are substantially the same relative to the maximum radiation direction of the radio waves radiated in substantially the front of the antenna 100. Therefore, in the following description, a description will be given regarding the radiation pattern in the elevation angle direction.

As shown in FIG. 3, the horizontal axis indicates the angle in the elevation angle direction and the vertical axis indicates the antenna gain. A radiation pattern L1 of the radio waves radiated from the antenna 100 in a configuration in which there is no antenna directivity adjustment apparatus 1 according to this example embodiment is expressed by a dotted line. Further, a radiation pattern L2 of the radio waves radiated from the antenna directivity adjustment apparatus 1 is indicated by a solid line. The radiation pattern L1 and the radiation pattern L2 are each formed of a main lobe where the antenna gain is the highest and a side lobe where the antenna gain is lower than that of the main lobe. The main lobe in the radiation pattern L1 is denoted by a main lobe 20 and the side lobe in the radiation pattern L1 is denoted by a side lobe 21. On the other hand, the main lobe in the radiation pattern L2 is denoted by a main lobe 30 and the side lobe in the radiation pattern L2 is denoted by a side lobe 31. The beam width of the main lobe of the radio waves having the radiation pattern L1 is θ0. The beam width of the main lobe of the radio waves having the radiation pattern L2 is θ1.

The antenna directivity adjustment apparatus 1 increases the beam width θ0 of the radio waves output from the antenna 100 to convert the radio waves in such a way that the beam width thereof becomes θ1 (θ1>θ0). That is, the antenna directivity adjustment apparatus 1 converts the radio waves having the radiation pattern L1 into the radio waves having the radiation pattern L2.

As shown in FIG. 3, as compared to the radiation pattern L2 with the radiation pattern L1, a maximum value G2 of the antenna gain of the main lobe 30 becomes smaller than a maximum value G1 of the antenna gain of the main lobe 20. However, in the part of the side lobe 21 of the radiation pattern L1, the solid line is generally larger than the dotted line, and the antenna gain of the radiation pattern L2 is generally larger than that of the radiation pattern L1. Therefore, it can be said that the radiation pattern L2 is a radiation pattern whose antenna gain is higher than that of the radiation pattern L1 at a wide angle. In other words, it can be said that the radiation pattern L2 output from the antenna directivity adjustment apparatus 1 is a radiation pattern whose antenna gain is generally higher than that of the radiation pattern L1 output from the antenna 100. That is, it can be said that the radiation pattern of the radio waves output from the antenna directivity adjustment apparatus 1 is an efficient radiation pattern in which the reduction in the antenna gain is generally small and the S/N (signal-to-noise) ratio is generally high.

It can be said that the high antenna gain means a high level of the radio waves output from the antenna. Therefore, it can be said that the radio waves output from the WG opening 12a are radio waves whose level is generally higher than that of the radio waves output from the antenna 100. Further, the WG opening 12a converts the radio waves in such a way that the beam width θ1 of the radio waves to be output becomes wider than the beam width θ0 of the radio waves output from the antenna 100. As a result, in the resulting radiation pattern, there is no null value in which the antenna gain becomes 0 at a wide angle. Therefore, the operator who adjusts the direction of the antenna 100 is able to find a main lobe whose reception level from the antenna 100 is high at a wide angle in the other antenna that is opposed to the antenna 100, and is able to easily adjust the direction of the antenna 100 at a wide angle using the main lobe having a large beam width.

As described above, in the antenna directivity adjustment apparatus 1 according to the first example embodiment, the receiving opening 11a of the parabolic antenna 11 receives the radio waves output from the radiation surface 100a of the antenna 100, converts the beam width using all the received radio waves, and outputs the resulting radio waves after the conversion from the WG opening 12a. Therefore, the radiation pattern L2 of the radio waves output from the antenna directivity adjustment apparatus 1 can generally be the radiation pattern L2 having an antenna gain higher than that of the radiation pattern L1 of the radio waves output from the antenna 100. Accordingly, with the antenna directivity adjustment apparatus 1 according to the first example embodiment, it becomes possible to prevent the antenna gain from being reduced.

Further, the antenna directivity adjustment apparatus 1 according to this example embodiment converts the radio waves in such a way that the beam width of the radio waves output from the antenna 100 is increased, and outputs the resulting radio waves after the conversion. Therefore, there is no null value at a wide angle in the radio waves output from the antenna directivity adjustment apparatus 1 compared to the radio waves output from the antenna 100. Further, as described above, the level of the radio waves output from the antenna directivity adjustment apparatus 1 is generally higher than that of the radio waves output from the antenna 100. Accordingly, even in a case in which the beam width of the main lobe of the radio waves output from the antenna 100 is narrow, the main lobe 30 can be easily detected in the other antenna that is opposed to the antenna 100. Further, since the beam width of the radio waves output from the antenna directivity adjustment apparatus 1 (i.e., the beam width of the main lobe 30) is wide, the operator who adjusts the direction of the antenna 100 is able to easily adjust the direction of the antenna 100 at a wide angle.

Second Example Embodiment

Figure 4:
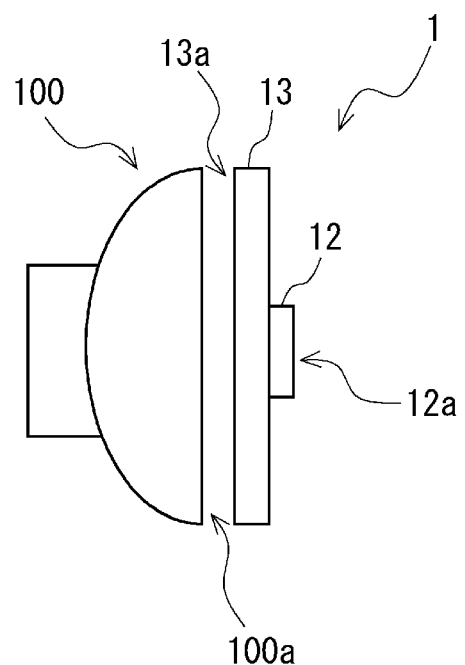
FIG. 4 is a schematic side view of an antenna directivity adjustment apparatus according to a second example embodiment.
Figure 5:
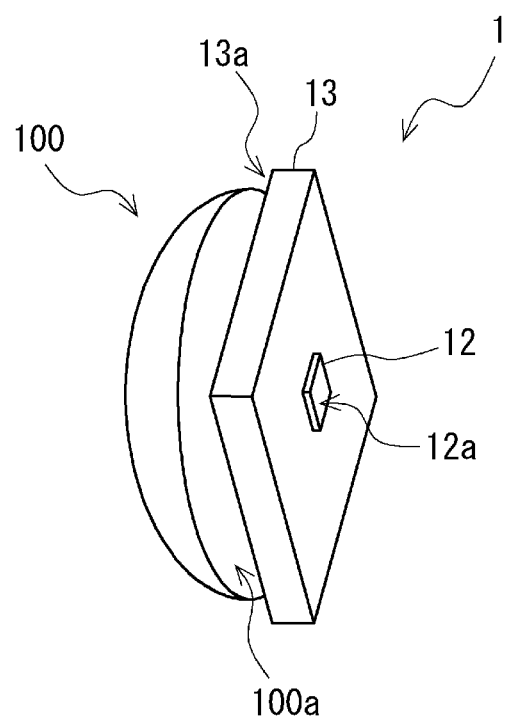
FIG. 5 is a schematic perspective view of the antenna directivity adjustment apparatus according to the second example embodiment.

Next, a second example embodiment will be explained. An antenna directivity adjustment apparatus 1 according to the second example embodiment has a configuration in which the parabolic antenna 11 according to the first example embodiment is replaced by a planar antenna 13. With reference to FIGS. 4 and 5, a configuration example of the antenna directivity adjustment apparatus 1 according to the second example embodiment will be explained. FIG. 4 is a schematic side view of the antenna directivity adjustment apparatus 1. FIG. 5 is a schematic perspective view of the antenna directivity adjustment apparatus 1 according to this example embodiment as viewed from a somewhat front direction of the antenna 100 rather than the side surface thereof.

The antenna directivity adjustment apparatus 1 is arranged in the vicinity of the antenna 100 so as to be opposed thereto, similar to the first example embodiment. The antenna directivity adjustment apparatus 1 may be connected to the antenna 100 by a connection part (not shown). The antenna directivity adjustment apparatus 1 includes a planar antenna 13 and a waveguide 12. The planar antenna 13 corresponds to the second antenna 2 described in the outline of the example embodiments. The planar antenna 13 is, for example, a waveguide-type slot array antenna. The planar antenna 13 is provided with a plurality of slots (not shown) provided in the waveguide. The planar antenna 13 receives radio waves by a reception surface where a plurality of slots are provided, and the radio waves are output from this waveguide. The planar antenna 13 is not limited to a waveguide-type slot array antenna and may be another planar antenna such as a microstrip antenna.

The planar antenna 13 includes a reception surface 13a. The reception surface 13a is arranged in the vicinity of a radiation surface 100a of the antenna 100 so as to be opposed thereto, and receives radio waves output from the antenna 100. The area of the reception surface 13a is, for example, substantially the same as that of the radiation surface 100a of the antenna 100. However, it is not limited thereto. The area of the reception surface 13a may be larger than that of the radiation surface 100a of the antenna 100, or the area of the reception surface 13a may be smaller than that of the radiation surface 100a of the antenna 100. The planar antenna 13 is connected to the waveguide 12, converges the radio waves received by the reception surface 13a, and outputs the converged radio waves to the waveguide 12.

The waveguide 12 is, for example, a rectangular waveguide or a circular waveguide. The waveguide 12 has one end connected to the planar antenna 13 and the other end that is opened. This opening is referred to as a WG opening 12a. The WG opening 12a is provided in such a way that it causes the radio waves output from the radiation surface 100a of the antenna 100 to penetrate therethrough. Therefore, the main lobe of the radio waves output from the WG opening 12a is formed in the same direction as the main lobe of the radio waves output from the antenna 100. Since the planar antenna 13 is a waveguide-type slot antenna, the waveguide 12 may not be provided, and the planar antenna 13 may be configured to output the radio waves from the waveguide of the planar antenna 13.

The WG opening 12a corresponds to the output unit 3 described in the outline of the example embodiments. The WG opening 12a converges radio waves received by the reception surface 13a, converts the radiation pattern of the radio waves, and outputs the resulting radio waves. Therefore, it can be said that the WG opening 12a is an output opening that outputs radio waves from the planar antenna 13. The WG opening 12a converts the radio waves in such a way that the beam width of the radio waves output from the antenna 100 is increased, similar to the case in the first example embodiment. Therefore, in this example embodiment as well, similar to the case described in the first example embodiment, the area of the WG opening 12a is smaller than the area of the reception surface 13a. In this example embodiment, as one example, the area of the reception surface 13a is described to be substantially the same as that of the radiation surface 100a of the antenna 100. Therefore, it can also be said that the area of the WG opening 13b is smaller than the area of the radiation surface 100a of the antenna 100.

Further, the radiation pattern of the radio waves output from the antenna directivity adjustment apparatus 1 according to this example embodiment is similar to that described in the first example embodiment. That is, as shown in FIG. 2, the antenna directivity adjustment apparatus 1 increases the beam width of the radio waves having the radiation pattern L1 output from the antenna 100, and converts the radio waves into the radio waves having the radiation pattern L2.

With the antenna directivity adjustment apparatus 1 according to the second example embodiment, similar to the antenna directivity adjustment apparatus 1 according to the first example embodiment, it is possible to prevent the antenna gain from being reduced and to easily perform direction adjustment of the antenna 100. In this example embodiment, the parabolic antenna 11 according to the first example embodiment is replaced by the planar antenna 13. Accordingly, with the antenna directivity adjustment apparatus 1 according to this example embodiment, the thickness of the apparatus can be reduced more than the one described in the first example embodiment, whereby it is possible to reduce the space.

Third Example Embodiment

Figure 6:
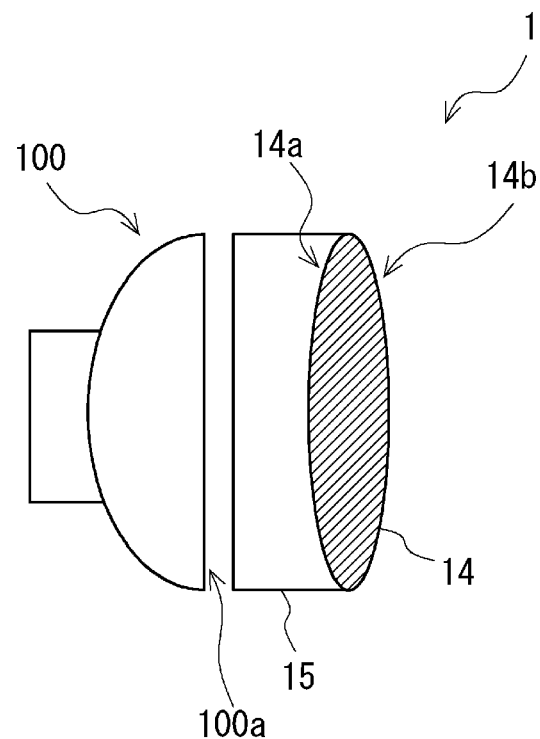
FIG. 6 is a schematic side view of an antenna directivity adjustment apparatus according to a third example embodiment.

Next, a third example embodiment will be explained. In the third example embodiment, the parabolic antenna 11 according to the first example embodiment and the planar antenna 13 according to the second example embodiment are replaced by a lens antenna. With reference to FIG. 6, a configuration example of the antenna directivity adjustment apparatus 1 according to this example embodiment will be explained. FIG. 6 is a schematic side view of the antenna directivity adjustment apparatus 1 according to this example embodiment.

The antenna directivity adjustment apparatus 1 according to the third example embodiment includes a lens antenna 14 and a support 15. The lens antenna 14 corresponds to the second antenna 2 described in the outline of the example embodiments. The lens antenna 14 is, for example, a dielectric lens antenna formed of a dielectric such as plastics, and has a lens surface that is a hyperboloidal surface having a convex shape. The lens antenna 14 is composed of a reception surface 14a and an output surface 14b. In the lens antenna 14 shown in FIG. 6, both the reception surface 14a and the output surface 14b have a convex shape. Instead, the reception surface 14a may have a planar shape, not the convex shape. The lens antenna 14 is configured in such a way that the focal point thereof is positioned on the axis (not shown) of the maximum radiation direction of the radio waves output from the antenna 100. That is, the main lobe of the radio waves output from the output surface 14b is formed in the same direction as the main lobe of the radio waves output from the antenna 100.

The reception surface 14a is arranged in the vicinity of the radiation surface 100a of the antenna 100 so as to be opposed thereto, and receives the radio waves output from the antenna 100. The reception surface 14a has, for example, an area substantially the same as that of the radiation surface 100a of the antenna 100. However, it is not limited thereto. The area of the reception surface 14a may be larger than that of the radiation surface 100a of the antenna 100 or the area of the reception surface 14a may be smaller than that of the radiation surface 100a of the antenna 100.

The output surface 14b corresponds to the output unit 3 described in the outline of the example embodiments. The output surface 14b transmits the radio waves received by the reception surface 14a and converges the radio waves, and outputs the converged radio waves.

As described above, the lens antenna 14 converges the received radio waves and outputs the converged waves, whereby it is possible to convert the radiation pattern of the radio waves to be output, similar to the antenna directivity adjustment apparatus 1 according to the first and second example embodiments. The radiation pattern of the radio waves output from the lens antenna 14 is similar to those described in the first and second example embodiments. That is, as shown in FIG. 2, the lens antenna 14 increases the beam width of the radio waves having the radiation pattern L1 output from the antenna 100, converts the radio waves into the radio waves having the radiation pattern L2, and outputs the converted radio waves from the output surface 14b.

The antenna directivity adjustment apparatus 1 according to this example embodiment is formed of the lens antenna 14. Therefore, by adjusting the curved surface of the lens antenna 14, the beam width and the antenna gain of the main lobe 30 can be easily adjusted to desired values.

The support 15 connects the antenna 100 and the lens antenna 14, and fixes the lens antenna 14. Therefore, it can be said that the support 15 is a connection part.

With the antenna directivity adjustment apparatus 1 according to this example embodiment, it is possible to prevent the antenna gain from being reduced and to easily perform direction adjustment of the antenna 100, similar to the antenna directivity adjustment apparatus 1 according to the first and second example embodiments.

Further, the antenna directivity adjustment apparatus 1 according to this example embodiment is formed of the lens antenna 14, whereby it becomes possible to easily adjust the beam width and the antenna gain of the radio waves output from the lens antenna 14 to desired values by adjusting the curved surface of the lens antenna 14. Therefore, it is possible to cause the main lobe to be easily detected in the other antenna that is opposed to the antenna 100 and to obtain the main lobe where the direction of the antenna 100 can be easily adjusted compared to the techniques described in the first and second example embodiments. Accordingly, the operator who adjusts the direction of the antenna 100 is able to perform direction adjustment of the antenna 100 more easily.

Fourth Example Embodiment

Figure 7:
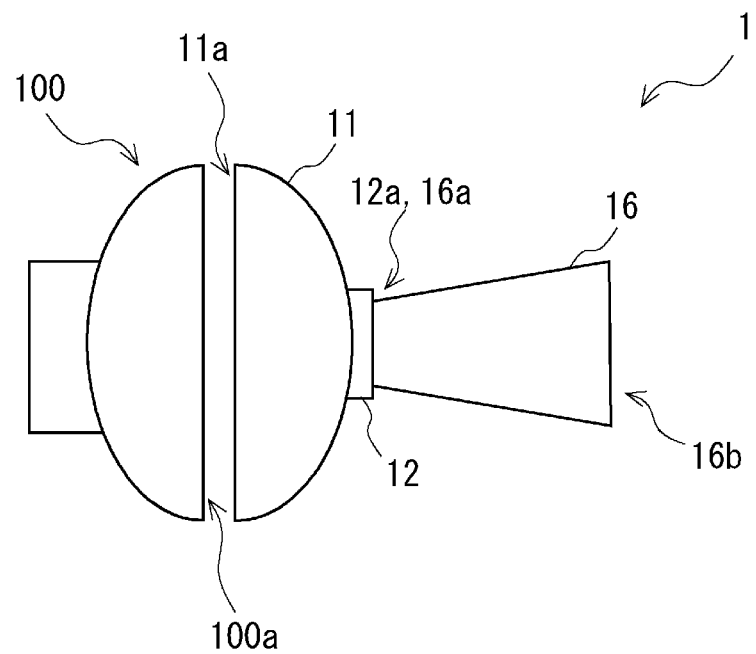
FIG. 7 is a schematic side view of an antenna directivity adjustment apparatus according to a fourth example embodiment.

Next, a fourth example embodiment will be explained. An antenna directivity adjustment apparatus 1 according to the fourth example embodiment has a configuration in which a horn antenna is added to the configurations of the antenna directivity adjustment apparatus 1 according to the first example embodiment. With reference to FIG. 7, a configuration example of the antenna directivity adjustment apparatus 1 according to this example embodiment will be explained. FIG. 7 is a schematic side view of the antenna directivity adjustment apparatus 1 according to this example embodiment.

The antenna directivity adjustment apparatus 1 according to this example embodiment includes a parabolic antenna 11, a waveguide 12, and a horn antenna 16. Since the parabolic antenna 11 and the waveguide 12 have configurations similar to those of the parabolic antenna 11 according to the first example embodiment, descriptions thereof will be omitted.

The waveguide 12 has one end connected to the parabolic antenna 11 and the other end connected to the horn antenna 16 that will be described later. The other configurations are similar to those in the first example embodiment.

The horn antenna 16 is connected to the WG opening 12a of the waveguide 12. The horn antenna 16 is, for example, a pyramid horn or a conical horn. The horn antenna 16 includes a receiving opening 16a and an output opening 16b.

The receiving opening 16a is an opening that is connected to the WG opening 12a of the waveguide 12. The receiving opening 16a receives radio waves transmitted from the waveguide 12. The output opening 16b corresponds to the output unit 3 described in the outline of the example embodiments. The area of the output opening 16b is larger than that of the receiving opening 16a, and the radiation pattern of radio waves received by the receiving opening 16a is further converted, and the radio waves after the conversion are output. The output opening 16b is arranged in such a way that it causes the radio waves output from the radiation surface 100a of the antenna 100 to penetrate therethrough. Therefore, the main lobe of the radio waves output from the output opening 16b is formed in the same direction as the main lobe of the radio waves output from the antenna 100.

As the length of the horn of the horn antenna 16 becomes longer, the beam width of the radio waves to be output becomes narrower. That is, as the length of the horn of the horn antenna 16 becomes longer, the main lobe of the radio waves output from the horn antenna 16 becomes sharper. On the other hand, as the length of the horn of the horn antenna 16 becomes shorter, the beam width to be output becomes wider. Further, the horn antenna 16 is configured in such a way that the opening area thereof is gradually increased from the receiving opening 16a toward the output opening 16b. Therefore, it can be said that adjusting the length of the horn is adjusting the area of the output opening 16b. Therefore, the antenna directivity adjustment apparatus 1 according to this example embodiment is able to adjust the beam width of the radio waves output from the output opening 16b by adjusting the opening area of the output opening 16b.

Assume a case in which, for example, a desired beam width and a desired antenna gain have not been obtained as a result of converting the radio waves so as to increase the beam width of the radio waves output from the antenna 100 by the antenna directivity adjustment apparatus 1 according to the first example embodiment. In this case, the horn antenna 16 in which the opening area of the output opening 16b is adjusted may be added to the antenna directivity adjustment apparatus 1 according to the first example embodiment, whereby it becomes possible to adjust the radio waves output from the antenna 100 to have a desired beam width and a desired antenna gain.

Figure 8:
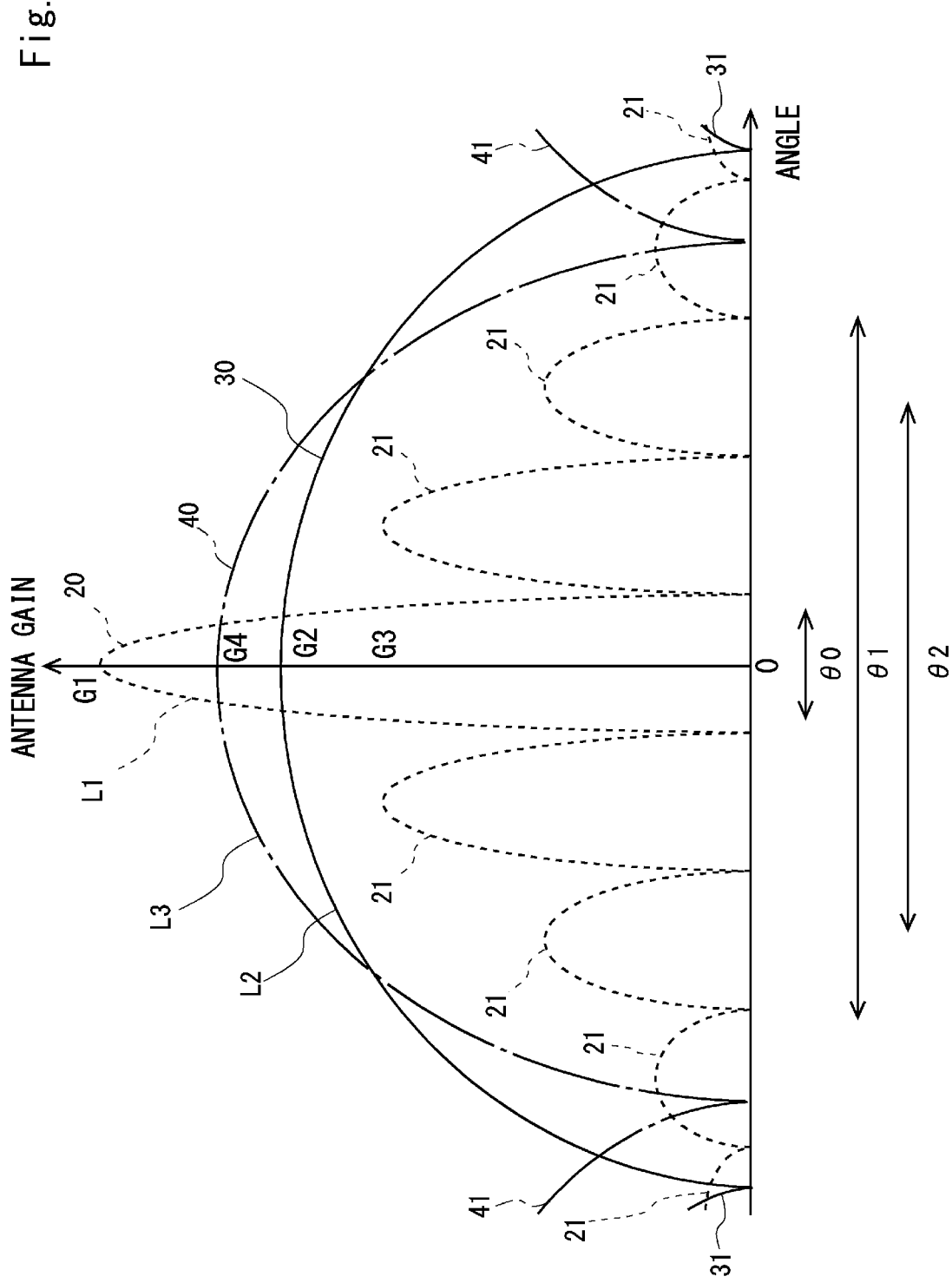
FIG. 8 is a schematic view showing radiation patterns of radio waves output from the antenna directivity adjustment apparatus according to the fourth example embodiment.

Referring next to FIG. 8, radiation patterns of the radio waves output from the antenna directivity adjustment apparatus 1 according to this example embodiment will be explained. FIG. 8 is a schematic view showing the radiation patterns of the radio waves output from the antenna directivity adjustment apparatus 1 according to this example embodiment. FIG. 8 is a diagram in which the radiation pattern of the radio waves output from the output opening 16b is added to the radiation patterns shown in FIG. 2. Specifically, in FIG. 8, a radiation pattern L1 shown by the dotted line shows a configuration in which the antenna directivity adjustment apparatus 1 is not provided, that is, a radiation pattern of the radio waves output from the antenna 100. Further, in FIG. 8, a radiation pattern L2 shown by a solid line shows a radiation pattern of the radio waves output from the antenna directivity adjustment apparatus according to the first example embodiment. In FIG. 8, a radiation pattern L3 shown by an alternate long and short dash line shows a radiation pattern of the radio waves output from the antenna directivity adjustment apparatus 1 according to this example embodiment. The radiation pattern L3 is also formed of a main lobe and a side lobe. The main lobe of the radiation pattern L3 is denoted by a main lobe 40 and the side lobe thereof is denoted by a side lobe 41. The beam width of the radio waves having the radiation pattern L3 is θ2.

As shown in FIG. 8, in the antenna directivity adjustment apparatus 1 according to the first example embodiment, the radiation pattern L1 output from the antenna 100 can be converted into the radiation pattern L2. However, a case in which, for example, the beam width θ1 of the radiation pattern L2 may not be a desired beam width may be assumed. In order to deal with this situation, the horn antenna 16 is connected to the parabolic antenna 11 according to the first example embodiment. That is, by employing the configuration of the antenna directivity adjustment apparatus 1 according to this example embodiment, the radiation pattern L2 can be converted into the radiation pattern L3. Specifically, by employing the configuration of the antenna directivity adjustment apparatus 1 according to this example embodiment, the output opening 16b is able to convert the radio waves in such a way as to narrow the beam width θ1 of the radiation pattern L2, and to output the radio waves having a beam width θ2 narrower than the beam width θ1.

Since the antenna directivity adjustment apparatus 1 is an apparatus for converting the radio waves so as to increase the beam width of the radio waves output from the antenna 100, the beam widths of the radio waves output from the output opening 16b satisfy the relation of the beam width $\theta 0 < \theta 2 < \theta 1$.

Further, it is also possible that the maximum value G2 of the antenna gain of the main lobe 30 of the radiation pattern L2 may not be a desired antenna gain as a result of converting the radiation pattern L1 output from the antenna 100 into the radiation pattern L2 by the antenna directivity adjustment apparatus 1 according to the first example embodiment. In order to deal with this situation, the configuration of the antenna directivity adjustment apparatus 1 according to this example embodiment is employed, whereby it is possible to convert the antenna gain of the radio waves output from the output opening 16b into G4, which is a value larger than the maximum value G2 of the antenna gain of the radiation pattern L2.

With the antenna directivity adjustment apparatus 1 according to this example embodiment, it becomes possible to prevent the antenna gain from being reduced and to easily perform direction adjustment of the antenna 100, similar to the antenna directivity adjustment apparatus 1 according to the first to third example embodiments.

Further, the antenna directivity adjustment apparatus 1 according to this example embodiment has a configuration in which the horn antenna 16 is further added to the configurations of the first example embodiment. Accordingly, with the antenna directivity adjustment apparatus 1 according to this example embodiment, the opening area of the output opening 16b of the horn antenna 16 is adjusted, whereby it becomes possible to adjust the beam width and the antenna gain of the radio waves output from the antenna directivity adjustment apparatus 1 to desired values.

Fifth Example Embodiment

Figure 9:
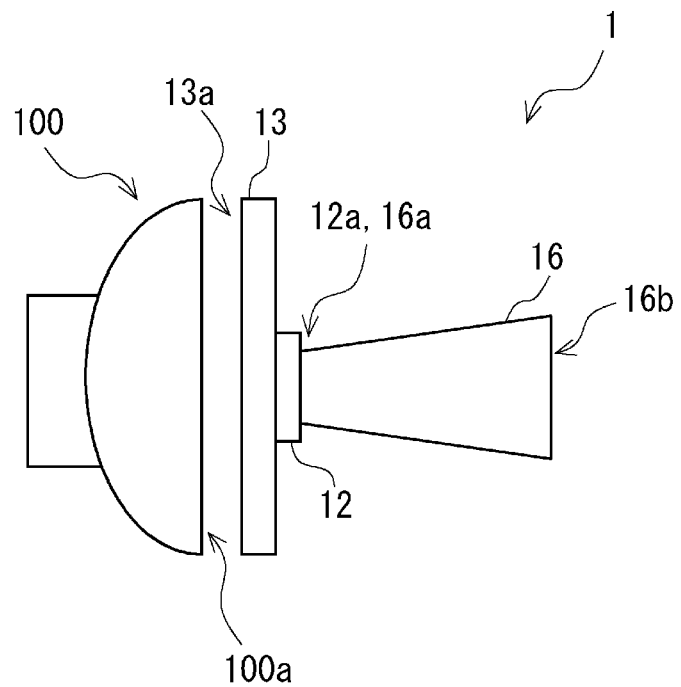
FIG. 9 is a schematic side view of an antenna directivity adjustment apparatus according to a fifth example embodiment.
Figure 10:
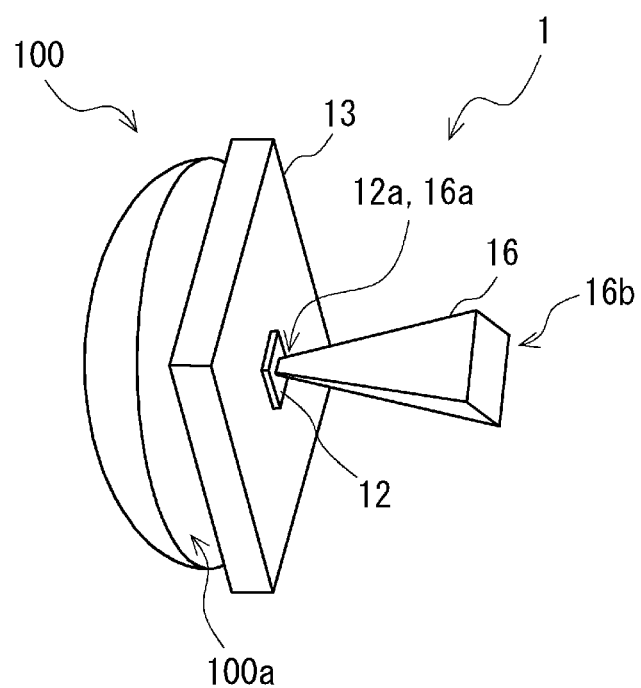
FIG. 10 is a schematic perspective view of the antenna directivity adjustment apparatus according to the fifth example embodiment.

Next, a fifth example embodiment will be explained. The fifth example embodiment has a configuration in which the horn antenna 16 is connected to the WG opening 12a according to the second example embodiment. In other words, the parabolic antenna 11 according to the fourth example embodiment is replaced by the planar antenna 13. With reference to FIGS. 9 and 10, a configuration example of the antenna directivity adjustment apparatus 1 according to this example embodiment will be explained. FIG. 9 is a schematic side view of the antenna directivity adjustment apparatus 1 according to this example embodiment. FIG. 10 is a schematic perspective view of the antenna directivity adjustment apparatus 1 according to this example embodiment as viewed from a somewhat front direction of the antenna 100 rather than the side surface thereof.

The antenna directivity adjustment apparatus 1 according to this example embodiment includes a planar antenna 13, a waveguide 12, and a horn antenna 16. The planar antenna 13 has a configuration similar to that of the planar antenna 13 according to the second example embodiment. The waveguide 12 and the horn antenna 16 have configurations similar to those of the waveguide 12 and the horn antenna 16 according to the fourth example embodiment. Therefore, descriptions of the respective components will be omitted. In this example embodiment as well, the output opening 16b of the horn antenna 16 corresponds to the output unit 3 according to the outline of the example embodiments.

Further, the radiation pattern of the radio waves output from the antenna directivity adjustment apparatus 1 according to this example embodiment is similar to that of the radio waves output from the antenna directivity adjustment apparatus 1 according to the fourth example embodiment. That is, as shown in FIG. 8, the antenna directivity adjustment apparatus 1 converts the beam width $\theta 1$ of the radiation pattern L2 into the radiation pattern L3 having the beam width $\theta 2$ narrower than the beam width $\theta 1$, and outputs radio waves having the radiation pattern L3. In the antenna directivity adjustment apparatus 1 according to this example embodiment, the adjustment of the antenna gain as well as the adjustment of the beam width can be performed, similar to the fourth example embodiment.

With the antenna directivity adjustment apparatus 1 according to this example embodiment, it becomes possible to prevent the antenna gain from being reduced and to easily perform direction adjustment of the antenna 100, similar to the antenna directivity adjustment apparatus 1 according to the first to fourth example embodiments. With the antenna directivity adjustment apparatus 1 according to this example embodiment, by adjusting the opening area of the output opening 16b of the horn antenna 16, it becomes possible to adjust the beam width and the antenna gain of the radio waves output from the antenna directivity adjustment apparatus 1 to desired values, similar to the fourth example embodiment.

Further, in the antenna directivity adjustment apparatus 1 according to this example embodiment, the parabolic antenna 11 according to the fourth example embodiment is replaced by the planar antenna 13. Accordingly, with the antenna directivity adjustment apparatus 1 according to this example embodiment, compared to the fourth example embodiment, the thickness of the apparatus can be reduced, whereby it is possible to reduce the space.

Sixth Example Embodiment

Figure 11:
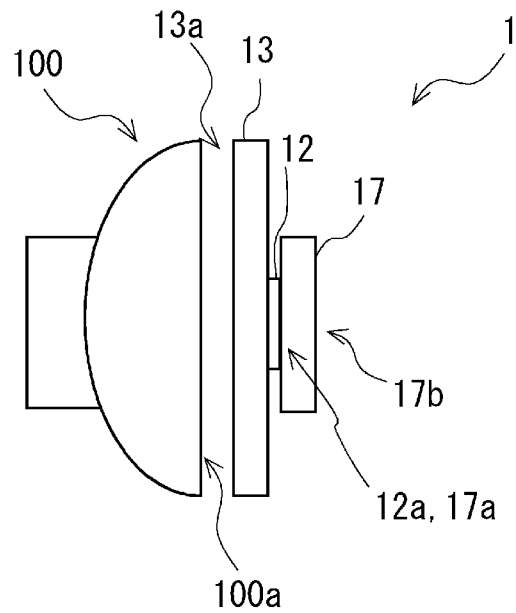
FIG. 11 is a schematic side view of an antenna directivity adjustment apparatus according to a sixth example embodiment.

Next, a sixth example embodiment will be explained. The sixth example embodiment has a configuration in which the horn antenna 16 according to the fourth and fifth example embodiment is replaced by a planar antenna 17. With reference to FIG. 11, a configuration example of the antenna directivity adjustment apparatus 1 according to this example embodiment will be explained. FIG. 11 is a schematic side view of the antenna directivity adjustment apparatus 1 according to this example embodiment.

The antenna directivity adjustment apparatus 1 according to this example embodiment includes a planar antenna 13, a waveguide 12, and a planar antenna 17. The planar antenna 13 has a configuration similar to that of the planar antenna 13 according to the second example embodiment. Further, the waveguide 12 has a configuration similar to that of the fourth example embodiment. It is sufficient that the waveguide 12 have a configuration that it connects the planar antenna 13 and the planar antenna 17. Therefore, the waveguide 12 may be, for example, a connector, not a waveguide.

The planar antenna 17 is, for example, a waveguide-type slot array antenna, similar to the planar antenna 13. In the planar antenna 17, a plurality of slots (not shown) are provided in the waveguide, and the radio waves introduced from the waveguide are output from the output opening in which the plurality of slots are provided. The planar antenna 17 is not limited to the waveguide-type slot array antenna and may be another planar antenna such as a microstrip antenna.

The planar antenna 17 includes a receiving opening 17a and an output opening 17b. The receiving opening 17a is connected to the WG opening 12a, and receives radio waves output from the WG opening 12a. The output opening 17b corresponds to the output unit 3 described in the outline of the example embodiments. The output opening 17b converges the radio waves received by the receiving opening 17a, converts the radiation pattern of the radio waves, and outputs the resulting radio waves after the conversion. The output opening 17b is arranged in such a way that it causes the radio waves output from the radiation surface 100a of the antenna 100 to penetrate therethrough. Therefore, the main lobe of the radio waves output from the output opening 17b is formed in the same direction as the main lobe of the radio waves output from the antenna 100. The output opening 17b is able to adjust the beam width and the antenna gain of the radio waves received by the receiving opening 17a by adjusting the opening area, similar to the procedure in the horn antenna described in the fourth and fifth example embodiments.

In order to increase the beam width, the opening area of the output opening 17b is adjusted to be smaller than the area of the receiving opening 17a and the beam width is adjusted to be narrow. On the other hand, in order to increase the antenna gain, the opening area of the output opening 17b is adjusted to be larger than the area of the receiving opening 17a. According to this structure, similar to the fourth and fifth example embodiments, it becomes possible to adjust the beam width and the antenna gain of the radio waves output from the antenna directivity adjustment apparatus 1 to desired values.

With the antenna directivity adjustment apparatus 1 according to this example embodiment, it becomes possible to prevent the antenna gain from being reduced and to easily perform direction adjustment of the antenna 100, similar to the antenna directivity adjustment apparatus 1 according to the first to fifth example embodiments. With the antenna directivity adjustment apparatus 1 according to this example embodiment, by adjusting the opening area of the output opening 17b, it becomes possible to adjust the beam width and the antenna gain of the radio waves output from the antenna directivity adjustment apparatus 1 to desired values.

Unlike the horn antenna 16 according to the fourth and fifth example embodiments, the antenna directivity adjustment apparatus 1 according to this example embodiment is formed of the planar antenna 17. Therefore, by adjusting the opening area of the output opening 17b, the radio waves may be converted in such a way that the beam width of the radio waves output from the WG opening 12a is further increased.

Further, in the antenna directivity adjustment apparatus 1 according to this example embodiment, the horn antenna 16 according to the fifth example embodiment is replaced by the planar antenna 17. Accordingly, with the antenna directivity adjustment apparatus 1 according to this example embodiment, compared to that described in the fifth example embodiment, the thickness of the apparatus can be further reduced, whereby it is possible to reduce the space.

Seventh Example Embodiment

Figure 12:
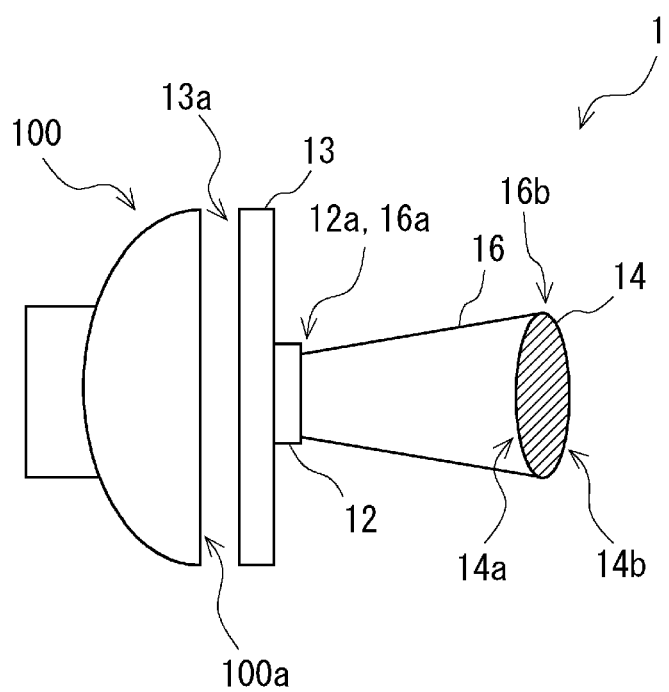
FIG. 12 is a schematic side view of an antenna directivity adjustment apparatus according to a seventh example embodiment.

Next, a seventh example embodiment will be explained. An antenna directivity adjustment apparatus 1 according to the seventh example embodiment has a configuration in which the lens antenna 14 is included in the output opening 16b of the horn antenna 16 according to the fifth example embodiment. With reference to FIG. 12, a configuration example of the antenna directivity adjustment apparatus 1 according to this example embodiment will be explained.

FIG. 12 is a schematic side view of the antenna directivity adjustment apparatus 1 according to this example embodiment.

The antenna directivity adjustment apparatus 1 according to this example embodiment includes a planar antenna 13, a waveguide 12, a horn antenna 16, and a lens antenna 14. Since the planar antenna 13, the waveguide 12, and the horn antenna 16 have configurations similar to those in the fifth example embodiment, the descriptions thereof will be omitted. In this example embodiment, the horn antenna 16 has a configuration in which the lens antenna 14 is included in the output opening 16b. The cross-sectional shape of the lens antenna 14 varies depending on the shape of the output opening 16b of the horn antenna 16. That is, when the horn antenna 16 is a conical horn antenna, the cross-sectional shape of the lens antenna 14 is circle. On the other hand, when the horn antenna 16 is a pyramid horn antenna, the cross-sectional shape of the lens antenna 14 is the same as the shape of the output opening 16b of the pyramid horn antenna.

The lens antenna 14 has a configuration similar to that of the lens antenna 14 according to the third example embodiment. The lens antenna 14 is configured in such a way that the focal point thereof is positioned on the axis (not shown) in the maximum radiation direction of the radio waves output from the antenna 100. That is, the main lobe of the radio waves output from the output surface 14b that will be described later is formed in the same direction as the main lobe of the radio waves output from the antenna 100.

The lens antenna 14 includes a reception surface 14a and an output surface 14b. The reception surface 14a receives radio waves output from the horn antenna 16. The output surface 14b corresponds to the output unit 3 described in the outline of the example embodiments. The output surface 14b converges the radio waves received by the reception surface 14a, converts the radiation pattern of the radio waves, and outputs the radio waves after the conversion. The lens antenna 14 is configured to be able to easily adjust the beam width and the antenna gain of the radio waves to be output to desired values by adjusting the curved surface of the lens antenna 14, similar to the structure in the third example embodiment.

Figure 13:
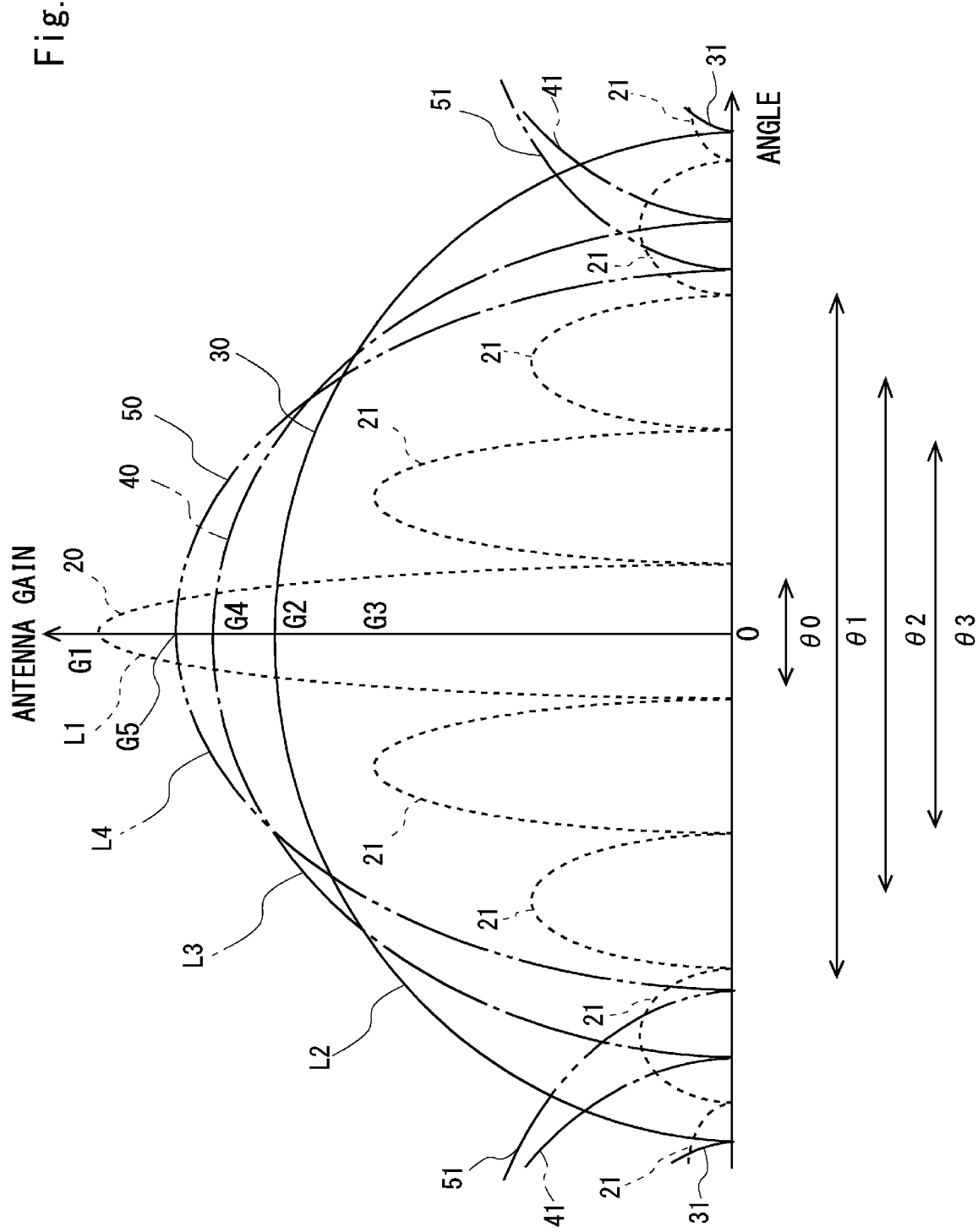
FIG. 13 is a schematic view showing radiation patterns of radio waves output from the antenna directivity adjustment apparatus according to the seventh example embodiment.

Next, radiation patterns of the radio waves output from the antenna directivity adjustment apparatus 1 according to this example embodiment will be explained. FIG. 13 is a schematic view showing the radiation patterns of radio waves output from the antenna directivity adjustment apparatus 1 according to this example embodiment. FIG. 13 is a diagram in which a radiation pattern L4 output from the antenna directivity adjustment apparatus 1 according to this example embodiment is added to the radiation patterns shown in FIG. 8.

Specifically, in FIG. 13, a radiation pattern L1 shown by a dotted line shows a configuration in which the antenna directivity adjustment apparatus 1 is not provided, that is, the radiation pattern of the radio waves output from the antenna 100. Further, in FIG. 13, a radiation pattern L2 shown by a solid line indicates a radiation pattern of the radio waves output from the antenna directivity adjustment apparatus according to the first example embodiment. In FIG. 13, a radiation pattern L3 shown by an alternate long and short dash line indicates a radiation pattern of the radio waves output from the antenna directivity adjustment apparatus 1 according to the fifth example embodiment. In FIG. 13, the radiation pattern L4 shown by an alternate long and three short dashes line indicates a radiation pattern of the radio waves output from the antenna directivity adjustment apparatus 1 according to this example embodiment. The radiation pattern L4 is also formed of a main lobe and a side lobe. The main lobe of the radiation pattern L4 is denoted by a main lobe 50 and a side lobe is denoted by a side lobe 51. The beam width of the radio waves having the radiation pattern L4 is θ3.

As shown in FIG. 13, in the antenna directivity adjustment apparatus 1 according to the fifth example embodiment, the radiation pattern L1 of the radio waves output from the antenna 100 can be converted into the radiation pattern L3. It is possible, however, that the beam width θ2 of the radiation pattern L3 may not be a desired beam width. In order to deal with this situation, in this example embodiment, the radiation pattern can be converted into the radiation pattern L4 by connecting the lens antenna 14 to the horn antenna 16. Specifically, the configuration of the antenna directivity adjustment apparatus 1 according to this example embodiment is employed, whereby it becomes possible to cause the radio waves output from the output surface 14*b* of the lens antenna 14 to have the beam width θ3 narrower than the beam width θ2.

Further, it is possible that the antenna gain G4 of the radiation pattern L3 of the radio waves output from the antenna directivity adjustment apparatus 1 according to the fifth example embodiment may not be a desired antenna gain G5. In this case as well, the lens antenna 14 is connected to the horn antenna 16, whereby the radiation pattern can be converted into the radiation pattern L4. That is, by using the antenna directivity adjustment apparatus 1 according to this example embodiment, the desired antenna gain G5 can be obtained.

With the antenna directivity adjustment apparatus 1 according to this example embodiment, similar to the antenna directivity adjustment apparatus 1 according to the first to sixth example embodiments, it becomes possible to prevent the antenna gain from being reduced and to easily perform direction adjustment of the antenna 100.

Further, in the antenna directivity adjustment apparatus 1 according to this example embodiment, the lens antenna 14 is provided in the output opening 16*b* of the horn antenna 16. Therefore, by adjusting the curved surface of the lens antenna 14, compared to the fifth example embodiment, it is possible to further adjust the beam width and the antenna gain of the radio waves output from the antenna directivity adjustment apparatus 1 to desired values.

Other Example Embodiments

While the antenna directivity adjustment apparatus 1 is arranged to be opposed to the radiation surface 100*a* of the antenna 100 as an example in the first to seventh example embodiments, the antenna directivity adjustment apparatus 1 may be arranged also in the other antenna that is opposed to the antenna 100. In this case, the beam width of the radio waves radiated from the other antenna that is opposed to the antenna 100 becomes wider. As a result, the operator who adjusts the direction of the antenna 100 is able to easily make the main lobes with wide beam widths opposed to each other, whereby it becomes possible to perform direction adjustment of the antenna 100 more easily.

Further, the opening area of the WG opening 12*a* is smaller than that of the receiving opening 11*a* in the first example embodiment. However, the WG opening 12*a* may be the same as the opening area of the receiving opening 11*a*. In this case, the WG opening 12*a* is formed to have, for example, an elliptical shape or a rectangular shape, not a circular shape or a square shape, and is configured in such a way that one width thereof is larger than the other width.

According to the aforementioned configuration, when, for example, the horizontal direction of the antenna 100 is adjusted, the antenna directivity adjustment apparatus 1 is arranged in such a way that the receiving opening 11*a* becomes parallel to the radiation surface 100*a* of the antenna 100. Then the antenna directivity adjustment apparatus 1 is adjusted in such a way that the short axis becomes parallel to the ground surface when the WG opening 12*a* is an ellipse and the short side becomes parallel to the ground surface when the WG opening 12*a* is a rectangle. Then the beam width of only the horizontal direction of the antenna 100 of the radio waves output from the antenna directivity adjustment apparatus 1 is increased. This makes it possible for the operator to easily adjust the horizontal direction of the antenna 100.

After the direction adjustment of the horizontal direction of the antenna 100 is performed, the antenna directivity adjustment apparatus 1 is rotated by 90 degrees in one of the right and left directions on the plane parallel to the opening surface of the antenna 100. That is, the antenna directivity adjustment apparatus 1 is adjusted in such a way that the short axis becomes vertical to the ground surface when the WG opening 12*a* is an ellipse and the short side becomes vertical to the ground surface when the WG opening 12*a* is a rectangle. Then the beam width of only the elevation angle direction of the antenna 100 of the radio waves output from the antenna directivity adjustment apparatus 1 is increased. Therefore, the operator is able to easily adjust the elevation angle direction of the antenna 100. Accordingly, as described above, even in a case in which the area of the WG opening 12*a* is substantially the same as the opening area of the receiving opening 11*a*, the operator is able to easily adjust the direction of the antenna 100. The second example embodiment may be configured in a similar way.

While the present disclosure has been described above with reference to the example embodiments, the present disclosure is not limited to the aforementioned example embodiments. Various changes that may be understood by one skilled in the art may be made on the configuration and the details of the present disclosure within the scope of the present disclosure.

This application is based upon and claims the benefit of priority from Japanese Patent Application No. 2017-056089, filed on Mar. 22, 2017, the disclosure of which is incorporated herein in its entirety by reference.

REFERENCE SIGNS LIST

1 ANTENNA DIRECTIVITY ADJUSTMENT APPARATUS
2 SECOND ANTENNA
3 OUTPUT UNIT
11 PARABOLIC ANTENNA
12 WAVEGUIDE
13, 17 PLANAR ANTENNA
14 LENS ANTENNA
15 SUPPORT
16 HORN ANTENNA
12*a* WG OPENING
13*a*, 14*a* RECEPTION SURFACE
14*b* OUTPUT SURFACE
11*a*, 16*a*, 17*a* RECEIVING OPENING
16*b*, 17*b* OUTPUT OPENING
20, 30, 40, 50 MAIN LOBE
21, 31, 41, 51 SIDE LOBE

100 ANTENNA
100a RADIATION SURFACE

The invention claimed is:

1. An antenna directivity adjustment apparatus comprising:
   a second antenna that is opposed to a radiation surface of a first antenna and receives radio waves output from the first antenna; and
   an output unit that is provided in the second antenna, converts a first beam width of the received radio waves into a second beam width wider than the first beam width, and outputs the radio waves having the second beam width,
   wherein the second antenna includes a receiving opening that is arranged in the vicinity of the radiation surface of the first antenna, and wherein the receiving opening of the second antenna has an area and a shape substantially the same as those of the radiation surface of the first antenna.

2. The antenna directivity adjustment apparatus according to claim 1, wherein the output unit is an output opening that is provided so as to cause the radio waves output from the first antenna to penetrate therethrough, the output unit outputting the radio waves having the second beam width.

3. The antenna directivity adjustment apparatus according to claim 2, wherein the output opening has an area smaller than that of the radiation surface of the first antenna.

4. The antenna directivity adjustment apparatus according to claim 1, wherein the second antenna is a parabolic antenna or a planar antenna.

5. The antenna directivity adjustment apparatus according to claim 1, wherein
   the second antenna is a lens antenna, and
   the output unit is an output surface that outputs the radio waves having the second beam width from the lens antenna.

6. The antenna directivity adjustment apparatus according to claim 1, further comprising a third antenna connected to the second antenna, wherein
   the output unit is an output opening that is provided so as to cause the radio waves output from the first antenna to penetrate therethrough, the output unit outputting radio waves from the third antenna, and
   the output unit converts a first beam width of radio waves received by the second antenna into a third beam width that is wider than the first beam width but is narrower than the second beam width and outputs the radio waves having the third beam width.

7. The antenna directivity adjustment apparatus according to claim 6, wherein the third antenna is a pyramid horn antenna, a conical horn antenna, or a planar antenna.

8. The antenna directivity adjustment apparatus according to claim 6, wherein
   the third antenna is a conical horn antenna or a pyramid horn antenna,
   the antenna directivity adjustment apparatus further includes a lens antenna connected to an output opening of the conical horn antenna or the pyramid horn antenna,
   the output unit is an output surface that outputs radio waves from the lens antenna, and
   the output unit converts a first beam width of radio waves received by the second antenna into a fourth beam width narrower than the second beam width and the third beam width and outputs the radio waves having the fourth beam width.

9. An antenna directivity adjustment method in an antenna directivity adjustment apparatus, the method comprising:
   receiving radio waves output from a first antenna by a second antenna that is opposed to a radiation surface of the first antenna;
   converting a first beam width of the radio waves received by the second antenna into a second beam width wider than the first beam width; and
   outputting radio waves having the beam width after the conversion,
   wherein the second antenna includes a receiving opening that is arranged in the vicinity of the radiation surface of the first antenna, and wherein the receiving opening of the second antenna has an area and a shape substantially the same as those of the radiation surface of the first antenna.

* * * * *